Aug. 5, 1958  Z. O. ST. PALLEY  2,845,935
APPARATUS FOR CLEANING PIPE LINES
Filed March 18, 1957  2 Sheets-Sheet 1

INVENTOR.
Zoltan O. St. Palley

Aug. 5, 1958

Z. O. ST. PALLEY 2,845,935

APPARATUS FOR CLEANING PIPE LINES

Filed March 18, 1957

INVENTOR.
Zoltan O. St. Palley

United States Patent Office 2,845,935
Patented Aug. 5, 1958

2,845,935

APPARATUS FOR CLEANING PIPE LINES

Zoltan O. St. Palley, Branford, Conn.

Application March 18, 1957, Serial No. 646,926

5 Claims. (Cl. 134—57)

My present invention relates to apparatus for washing pipe lines and other equipment by means of a periodically reversed flow of cleaning fluid, and is a continuation in part of my prior application Serial No. 589,780, filed on June 6, 1956, and now abandoned.

The principal object of this invention is to provide an apparatus for the sanitary cleaning of pipe lines and other equipment in the dairy, food processing, and other industries, which will accomplish the following: a full utilization of the expansive force of the compressed air by cutting off the intake of the compressed air before the transfer of the cleaning fluid is completed; a smoother reversal of the flow of the cleaning fluid by the deceleration of the incoming flow; a better washing efficiency obtained by imparting a rotary motion to the cleaning fluid.

Other objects and advantages of this invention will be apparent during the course of the following description.

Figure 1:
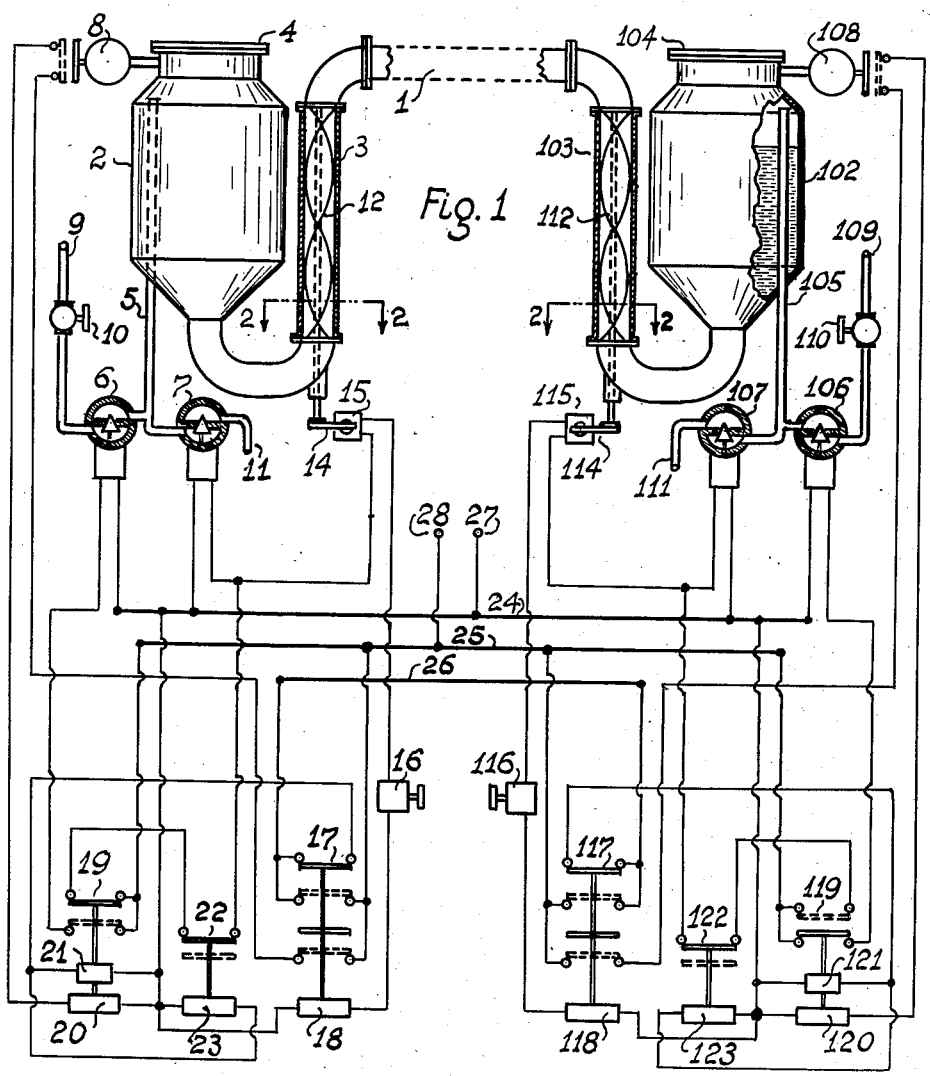
Figure 3:
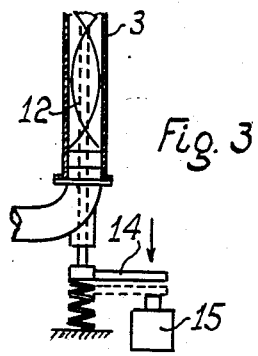
Figure 2:
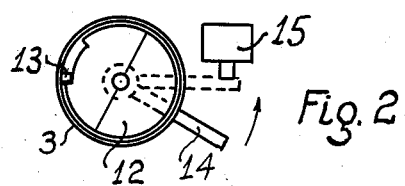
Figure 4:
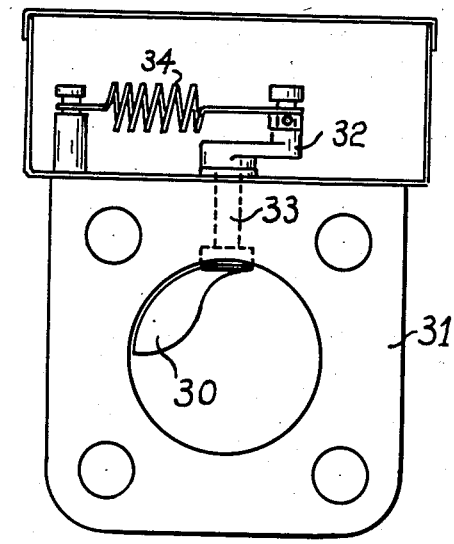
Figure 6:
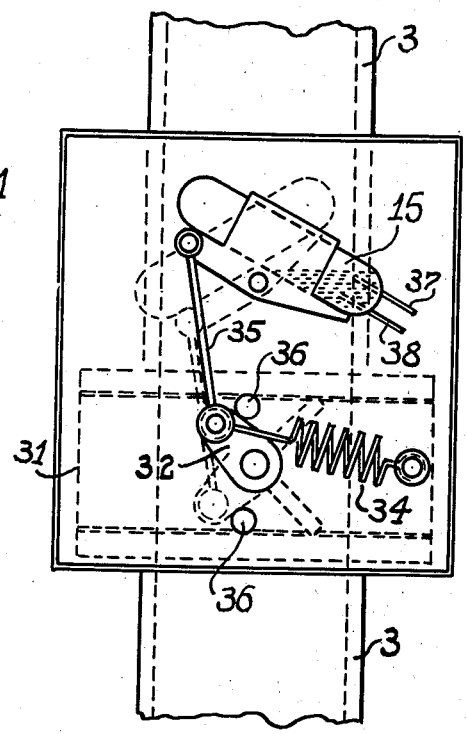
Figure 5:
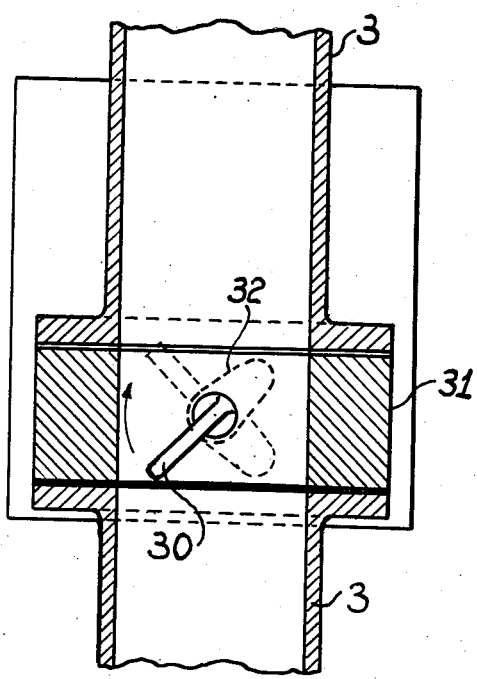

In the accompanying drawings, forming a part of this application, wherein for the purpose of illustration, are shown a preferred and also modified forms of my invention, Figure 1 is a diagrammatic view of my invention, Figure 2 is a sectional view through the line 2—2 of Figure 1, Figure 3 is a side view of a modified form of the flow detector, Figure 4 is a plan view of another modified form of the flow detector, Figure 5 is a vertical sectional view of the same modified form, Figure 6 is an elevational view of the same modified form.

Referring to the drawings, in Fig. 1 the numeral 1 designates the article to be washed which, in this case, is a pipe line, the ends of which are connected to the outlet pipes 3 and 103 of the tanks 2 and 102, respectively.

As the two tanks and the associated mechanisms are duplicates the description of one will be sufficient for the understanding of the present invention.

The tank 2 is provided with a removable cover 4, adapted for the hermetic closing of the tank. Leading into the upper portion of the tank 2 is the air pipe 5. Communicating with the said air pipe 5 are air inlet valve 6 and the air outlet valve 7, which are solenoid operated, and are open when the solenoid is energized and closed when the solenoid is deenergized. Valve 6 receives the compressed air from the air supply pipe 9, through the manual control valve 10. Valve 7 leads to the exhaust pipe 11.

Communicating with the upper portion of the tank 2 is the air pressure relay 8 adapted to close an electric circuit when the air pressure reaches a predetermined value. The construction of this pressure relay is known in the art and needs no description.

An essential element in the present invention is the flow detector 12, mounted within the outlet pipe 3. The flow detector is a movable flow resistant element so arranged that it will be moved by the impact of the flow of cleaning fluid and thereby actuate an electric switch. In this preferred form, the flow detector consists of a spiral guide rotatably mounted in the outlet pipe 3 and is so constructed that a column of cleaning fluid flowing from the tank 2 to the tank 102 will rotate the flow detector 12 and the connected arm 14 clock-wise, within the angular limit permitted by the stop 13, into the full line position shown in Fig. 2. Conversely, a fluid column arriving from the tank 102 will rotate said spiral shaped flow detector 12 counter clock-wise, moving the arm 14 into the dotted line position, shown in Fig. 2, and thereby causing the actuation of the switch 15 so as to close an electric circuit.

It is important that the torque required to rotate the flow detector 12 is too great to permit its rotation by the flow of air preceding the column of the cleaning fluid. In this preferred form the magnitude of this torque can be regulated by the friction in the adjustable stuffing box disposed between the flow detector 12 and the arm 14. It is, however within the spirit of this invention to employ other means known in the art for the regulation of this torque.

Referring to Fig. 1, the numeral 17 designates the actuating relay, having a double throw and a single throw switch, which will move into the dotted line position when the solenoid 18 is energized, and will return into the full line position, due to spring pressure, when said solenoid is deenergized.

The numeral 19 designates the main relay which has a double throw switch actuated by two solenoids so that, when solenoid 20 is energized the switch will move into the dotted line position and will remain there after the solenoid 20 is deenergized, until the other solenoid 21 is energized, when the switch will return into the full line position and will remain there after the solenoid 21 is deenergized.

The auxiliary relay 22 has a single throw switch which moves into the dotted line position when the solenoid 23 is energized, and will return when said solenoid is deenergized.

Connected between the switch 15 and the solenoid 18 is the time delay relay 16, which is adapted to close the electric circuit after a variable predetermined time following the energization of the switch 15. The construction of this time delay relay is known in the art and needs no description here.

In the other tank the corresponding elements are designated by the same numerals plus 100.

The various elements of each tank are connected by electrical circuits in the manner shown in Fig. 1, and the circuits of the two tanks are connected together by the lines 24, 25, and 26, of which 24 and 25 are connected to the electric supply terminals 27 and 28, respectively.

Fig. 3 shows a modification of the flow detector 12 in which the spiral type flow resistant element is not rotatable but axially slidable, so that the impact of the incoming fluid column will move the spiral downwardly, against the spring pressure, causing the arm 14 to actuate the switch 15.

Another modified form of the flow detector is illustrated in Figs. 4, 5, and 6, in which the flow resistant element consists of the blade 30, pivotally supported by the housing 31, which housing is inserted between sections of the outlet pipe 3 by basketed flange connections (see Fig. 5). Secured to the blade 30 is the shaft 33 carrying the crank 32, forming a mechanical unit, rotatable between the angular limits set by the stops 36, shown in Fig. 6. Connected to the crank 32 by the connecting rod 35 is the switch 15 which, in this form, is of the mercury type and is pivotally supported so as to swing from the full line position into the dotted line position, as a result of which the mercury in contact with the leads 37 and 38 will be transferred to the opposite end of the tube interrupting the circuit between these leads. The switch 15, crank 32 and the blade 30 are so coordinated that when the blade 30 swings down into the full line position, shown in Fig. 5, due to the impact of a downward flow of the cleaning fluid, it will cause the crank 32 and the switch 15 to swing into the full line position, shown in Fig. 6, thereby closing the circuit between the leads 37 and 38. Conversely, an upward flow of the cleaning fluid will move the blade 30, crank 32 and switch 15 into the dotted line positions, shown in Figs. 5 and 6, causing the opening of the circuit between the leads 37 and 38 of the switch 15. The spring 34 engaging the crank 32 (see Fig. 6) tends to retain the crank in the end positions and is employed to regulate the torque required to swing the blade 30 from one position to the other, so that the torque required will be smaller than that produced by the impact of the flow of the cleaning fluid and greater than that produced by the flow of air preceding the cleaning fluid.

The operation of my invention is as follows:

Referring to Fig. 1, the cleaning fluid is deposited in the tank 102, and the covers 4 and 104 are closed. Then, the terminals 27 and 28 are connected to the electric supply, and the manual control valves 10 and 110 are opened. The relays 19 and 119 being in the positions shown in Fig. 1, the current flowing from line 24 to 25 will energize and open the valves 106 and 7. As a result of this, the compressed air will flow from the air supply pipe 109 and through the air inlet valve 106 and the air pipe 105, into the tank 102, forcing the cleaning fluid from the tank 102 and through the outlet pipe 103, into the pipe line 1. This moving column of cleaning fluid will tend to rotate the spiral flow detector 112 clockwise, but as this rotation is limited by the stop 13, shown in Fig. 3, the moving column of cleaning fluid will itself assume a counter clock-wise rotation, which will increase the scrubbing effect of the column in the pipe line to be cleaned.

Due to the advance of the column of cleaning fluid in the pipe line 1 the displaced air will flow from the pipe line through the outlet pipe 3 into the tank 2, and from there through the air pipe 5, outlet valve 7, and exhaust pipe 11 into the open air. This flow of displaced air, having only moderate velocity, will not have sufficient thrust to change the position of the flow detector 12. When, however, the column of cleaning fluid, following this flow of air, will reach the flow detector 12, the impact of the fluid will cause the spiral to rotate counter clock-wise, moving arm 14 from the full line position, shown in Fig. 2, to the dotted line position until it closes an electric circuit by means of the switch 15.

The closing of the switch 15 will pass an electric current from the line 25, and through the closed contacts of relays 19 and 22 (see Fig. 1), which will start the time delay relay 16 and, after the time interval for which the time delay relay is set, will energize the solenoid 18, and return to the line 24.

The energizing of the solenoid 18 will move the switches of the actuating relay 17 in the dotted line position, which will have the following consequences. The upper contact of the relay 17, now being in the dotted line position, will send a current from the line 25, and through the line 26, to the other tank 102, which current will flow through the upper contacts of the relay 117, in its full line position, and will energize the solenoid 121 of the main relay 119, and also the solenoid 123 of the auxiliary relay 122, causing these relays to move into the dotted line positions. As the result of this, the air inlet valve 106 will close, cutting off the inflow of the compressed air.

The air outlet valve 107 will remain closed because the current sent from the line 25 through the dotted line contacts of the relay 119 is interrupted by the open (dotted line) contacts of the relay 122. In this position the high pressure air enclosed in the tank 102 will, by its expansive force, continue the transfer of the cleaning fluid, however, at decreasing velocity due to the gradual decreasing of the air pressure behind the moving column of cleaning fluid.

This cutting off of the compressed air intake before the transfer of the cleaning fluid is completed, is an essential feature of the present invention, which has two important objects: one is to reduce the compressed air consumption, the other is reduce the mechanical impact at the reversal of the flow of cleaning fluid by decreasing its velocity at the end of the transfer.

During the passage of the cleaning fluid in the pipe line, the air pressure in the receiving tank 2 will be low, so that the switch of the pressure relay 8 will be in the open position, as shown by the full line in Fig. 1. When, however, the transfer of the fluid is completed and the high pressure air, back of the column of fluid, will reach the bottom opening of the tank 2, this air will rise very forcefully to the upper portion of the tank 2, causing a sudden rise in the air pressure and the resultant closing of the switch of the pressure relay 8.

The closing of the switch of the pressure relay 8 will have the following results: The actuating relay 17, now being in the dotted line position due to the previous closing of the switch 15, described above, the closed switch of the pressure relay 8 will set up a current from the line 25, through the lower (dotted line) contact of the relay 17, to the solenoid 20 of the main relay 19, causing this main relay to move from the full line position into the dotted line position. This move will energize and open the air inlet valve 6, will deenergize and close the air outlet valve 7, and will also interrupt the current which has been flowing from the end of the line 25 through the switch 15, the time delay relay 16, and the solenoid 18, thereby causing the deenergization of the relay 17 and its resultant move into its full line position.

This move will interrupt the current which has been flowing from the line 25, through the upper contact of the relay 17, and through the line 26, to the solenoids 121 and 123, of the other tank 102, causing the deenergizing of the relays 119 and 122. As the main relay 119 is constructed that the deenergization of the solenoids will not change its position, the contacts of this relay will remain in the dotted line position after the deenergization of the solenoid 121. The deenergization of the solenoid 123, however, will move the relay 122 back into the full line position, causing the energization and the opening of the air outlet valve 107.

This opening of the air outlet valve 107 will relieve the air pressure in the tank 102 and in the pipe line 1, permitting the compressed air, entering through the open inlet valve 6, to force the cleaning fluid from the tank 2 into the pipe line 1, and to the tank 102.

This will start a new transfer cycle, having the same phases as the transfer cycle just described. In the first phase, which may be called the power phase, the cleaning fluid is forced by the compressed air, entering through the inlet valve 6, from the tank 2 into the pipe line 1, at an increasing velocity. This power phase is terminated by the flow detector 112 of the receiving tank 102, which, moved by the impact of the arriving fluid column, closes the switch 115 and thereby sends a "pilot current" through the "pilot line" 26 to the tank 2, effecting the shutting off of the air intake by the closing of the intake valve 6. In the preferred form of my invention means is provided to obtain an adjustable time delay from the closing of the switch 15 to the actual starting of the "pilot current" in order to obtain a finer regulation of the transfer of the cleaning fluid.

The closing of the air intake starts the second phase, called the expansion phase, in which the transfer of the fluid is continued at decreasing velocity by the expansive force of the high pressure air enclosed in the sending tank 2. During this phase the pilot current is maintained in the line 26. This expansion phase ends when the transfer of the fluid is completed and the high pressure air, back of the fluid, enters the receiving tank 102 and causes a sudden increase of the air pressure in this tank, which actuates the pressure relay 8, resulting in the stopping of the pilot current, the opening of the air inlet valve 106, the closing of the outlet valve 107, and the opening of the outlet valve 7, thereby completing the reversal of the fluid transfer.

It is fundamental in the present invention that the shutting off of the air intake is accomplished by a flow detector comprising a flow resistant element which is moved by the impact of the flow of cleaning fluid and thereby actuates a switch. In the preferred form described this flow resistant element has a spiral shape, which has the additional advantage of imparting a rotary motion to the outgoing flow of cleaning fluid, useful from the standpoint of the washing efficiency. It is obvious that the actuation of the switch 15 and 115 can be accomplished by flow resisting elements of various shapes and construction; therefore, it is within the spirit of the present invention to employ flow detectors of various shapes and construction, provided only that they are adapted to effect a change in the pilot circuit when subjected to the impact of the flow of cleaning fluid.

It is also within the spirit of the present invention to substitute equivalent hydraulic or pneumatic circuits, actuating and actuated elements for the electrical circuits, switches, and solenoids herein described.

It is to be understood that the forms of my invention, herein shown and described, are only examples of the same and that various changes in the size, shape, and arrangement of parts may be resorted to, without departing from the spirit of my invention or the scope of the subjoined claims.

I claim:

1. An apparatus for cleaning a pipe line, comprising: a pair of closed tanks for holding the cleaning fluid, each having an outlet pipe connected to opposite ends of the pipe line; a compressed air supply; a pair of air inlet valves, having open and closed positions, each of said inlet valves communicating with said air supply and with one of said tanks to admit compressed air, alternately, to one of the tanks in order to force the cleaning fluid through the pipe line into the other tank; a pair of air outlet valves, having open and closed positions, each communicating with one of said tanks for the exhaust of air; pilot circuit means operatively interconnecting said valves; a pair of flow detectors, each movably mounted in the outlet pipe of one of said tanks, and having two positions, the incoming flow position, which is assumed by said flow detector under the impact of the flow of cleaning fluid coming into the respective tank, and the outgoing flow position, which is assumed by said flow detector under the impact of the cleaning fluid going out from the respective tank, said flow detector being operatively connected with said pilot circuit means and being adapted so that when the flow detector of one of said tanks moves into the incoming flow position it will actuate the said pilot circuit means so as to close the air inlet valve of the other tank; a pair of pressure relay means, each communicating with the interior of one of said tanks, and operatively connected to said pilot circuit means, said pressure relay means being so adapted that, when the air pressure in the communicating tank reaches a variable predetermined value, the pressure relay means will actuate said pilot circuit means so as to open the air inlet valve and close the air outlet valve of the communicating tank, and open the air outlet valve of the other tank.

2. The apparatus of claim 1 in which time delay relay means is inserted in the operative connection of said flow detector and said pilot circuit means in order to delay the actuation of said pilot circuit means by said flow detector for a variable predetermined time.

3. The apparatus of claim 1 in which said pilot circuit means comprises solenoids operatively connected to said inlet and outlet valves; switches operatively connected to said flow detectors and pressure relay means; and an electrical circuit means interconnecting said solenoids and switches.

4. An apparatus for cleaning a pipe line, comprising, a compressed air supply; a pair of closed tanks for holding the cleaning fluid, and having outlet pipes connected to opposite ends of the pipe line, each tank having an air inlet valve communicating with said air supply controlling the flow of compressed air so as to force the cleaning fluid, alternately, from one tank, through the pipe line, into the other tank; a pair of flow detectors, each mounted in the outlet pipe of one of the tanks, and having two positions, the incoming flow position, which is assumed by said detector under the impact of the flow of fluid coming into the respective tank, and the outgoing flow position, which is assumed by said detector under the impact of the flow of fluid going out from the respective tank; pilot circuit means operatively connected to said valves and flow detectors so that when the flow detector of one of the tanks is moved into the incoming flow position said pilot circuit means will close the air inlet valve of the other tank.

5. The apparatus of claim 4 in which said pilot circuit means comprises a time delay relay means adapted to delay the opening of said air inlet valve for a predetermined time after said flow detector has moved into the incoming flow position.

References Cited in the file of this patent

UNITED STATES PATENTS 2,771,891     St. Palley              Nov. 27, 1956